July 31, 1934.　　　C. DORNIER　　　1,968,637
LANDING CHASSIS FOR AIRCRAFT
Filed March 14, 1933
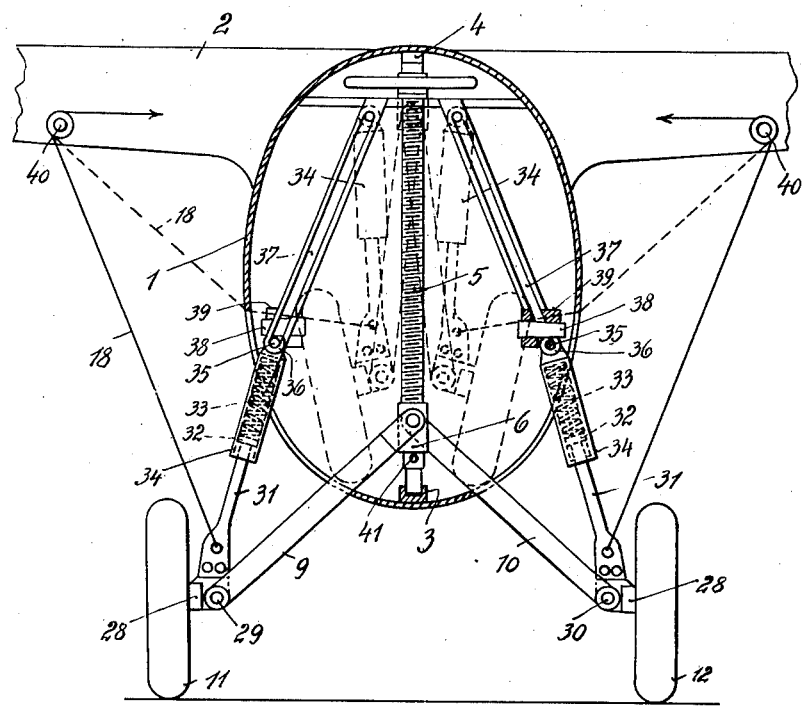
Inventor:
Claude Dornier
by Karl Michaelis
Atty.

Patented July 31, 1934

1,968,637

UNITED STATES PATENT OFFICE 1,968,637

LANDING CHASSIS FOR AIRCRAFT

Claude Dornier, Friedrichshafen, Germany, assignor of one-half to Dornier-Metallbauten G. m. b. H., Friedrichshafen, Germany Application March 14, 1933, Serial No. 660,690
In Germany April 26, 1932

2 Claims. (Cl. 244—2)

My invention relates to landing chassis for aircraft and more particularly to a collapsible landing chassis which can be concealed in some part of the craft. In the case of an airplane the chassis may be concealed in the fuselage.

It is an object of my invention to provide a landing chassis of the kind described in which the means for operating it are particularly simple. To this end I provide a threaded spindle which is arranged in the central vertical plane of the craft, with a nut mounted to travel on the spindle, and to the nut I pivotally connect the inner ends of a pair of arms whose outer ends support the wheels of the chassis.

In the final inner position of the concealed chassis the arms are doubled up against each other.

When the landing chassis according to my invention is concealed or housed in the fuselage or other part of the aircraft, i. e. in its final inner position, the planes of the two wheels include an angle whose apex points downwardly and is positioned in the central vertical plane of the part, and the arms, on which the wheels are mounted to rotate, include an acute angle whose apex points upwardly and is also positioned in the said plane. When in their active or final outer position, the arms are held by cables, as will be described.

In the drawing affixed to this specification and forming part thereof an airplane embodying my invention is illustrated diagrammatically by way of example in elevation, partly in section at right angles to the central vertical plane of the fuselage.

Referring to the drawing, 1 is the fuselage and 2 is the wing structure of the airplane. The wing structure is arranged on top of the fuselage so that it does not interfere with the mechanism for operating the landing chassis nor with the parts of the chassis.

Mounted to rotate in suitable bearings 3 and 4 in the central vertical plane of the fuselage 1 is a threaded spindle 5 whose thread may be right- or left-handed, as desired, 6 is a travelling nut on the spindle 5, 7 is a hand wheel keyed on the spindle below the upper bearing 4 for rotating the spindle, 8 is one of a pair of trunnions on the nut 6, 9 and 10 are wheel-supporting arms whose inner, preferably forked, ends are pivotally connected to the nut by the trunnions 8, and 11 and 12 are wheels mounted for rotation on journals 28 which are pivoted to the arms 9 and 10 at 29 and 30, respectively, each journal being rigidly connected to a rod 31, forming part of a spring buffer, by screws or rivets. Each rod, as shown in dotted lines at the right, has a piston or washer 32 at its upper end, which is loaded by a spring 33 in a cylinder 34. 35 is a pin in a holder 36 at the upper end of each cylinder 34, and 37 are slotted guide bars in the fuselage in which the pins 35 engage. 38 is a wedge or stop in a bracket 39 at the lower end of each guide 37 which fixes the cylinder 34 against upward movement on the guide to which it is allotted, by engaging its pin 35. The stops or wedges 38 are inserted when the chassis is in active position, and extracted when it is to be retracted, as shown in dotted lines.

Cables 18 are attached to the rods 31 at their lower ends, on account of the pivotal connection of the journals 28 to their arms 9 and 10, and are taken about fixed sheaves 40 on the wing structure 2. They may be controlled and fixed by any suitable means (not shown) from within the fuselage 1 and, when the landing chassis is concealed, as shown in dotted lines, extend in broken lines from the sheaves to the holes in the fuselage. Obviously friction-reducing means (not shown) may be provided where the cables 18 engage the walls of the fuselage at the upper sides of the holes. A stop 41 may be provided above the lower spindle bearing 3 for limiting the downward movement of the nut 6.

When it is desired to raise the chassis in order to conceal it in the fuselage 1, the hand wheel 7 or a mechanical drive (not shown) is rotated so that the nut 6 moves upwardly on the spindle 5. This causes the nut 6 to move in upward direction, entraining the pivotal point for the inner ends of the arms 9 and 10. The wheels 11 and 12 now approach each other. When the nut 6 is at its topmost position, the arms and wheels are in the positions shown in dotted lines, the planes of the wheels 11 and 12 including the aforesaid angle, with its apex in the central vertical plane of the fuselage and pointing downwardly, while the arms 9, 10 include the acute angle referred to, with its apex pointing upwardly.

I wish it to be understood that I do not desire to be limited to the exact details of construction shown and described for obvious modifications will occur to a person skilled in the art.

I claim:—

1. A collapsible landing chassis for aircraft, comprising a nut, means for displacing said nut in the central vertical plane of the craft, a pair of arms pivotally connected to said nut at their inner ends, a wheel mounted to rotate near the outer end of each arm, a spring buffer operatively connected to each arm at one end, a guide for the upper end of each buffer, and detachable means for holding each buffer against movement with respect to its guide.

2. A collapsible landing chassis for aircraft, comprising a nut, means for displacing said nut in the central vertical plane of the craft, a pair of arms pivotally connected to said nut at their inner ends, a journal pivotally connected to each arm, a wheel mounted to rotate on each journal, a spring buffer rigidly connected to each journal at one end, a guide for the upper end of each buffer, and detachable means for holding each buffer against movement with respect to its guide.

CLAUDE DORNIER.